United States Patent
Hewlett, Jr

[15] 3,662,264
[45] May 9, 1972

[54] RECTIFIER BRIDGE TYPE WATTMETER

[72] Inventor: Clarence Wilson Hewlett, Jr, Hampton, N.H.

[73] Assignee: General Electric Company

[22] Filed: June 26, 1969

[21] Appl. No.: 836,717

[52] U.S. Cl. ........................................................324/142
[51] Int. Cl. ..........................................G01r 7/00, G01r 21/00
[58] Field of Search....................324/142; 328/160; 235/194

[56] References Cited

UNITED STATES PATENTS

| | | | |
|---|---|---|---|
| 2,059,594 | 11/1936 | Massa, Jr. | 324/142 |
| 2,829,343 | 4/1958 | Miller | 324/142 |
| 3,218,554 | 11/1965 | Corson | 324/142 |
| 3,315,162 | 4/1967 | Liddle | 324/132 |

*Primary Examiner*—Alfred E. Smith
*Attorney*—Frank L. Neuhauser, William S. Wolfe, Oscar B. Waddell and Joseph B. Forman

[57] ABSTRACT

A wattmeter of the rectifier bridge type using a four-arm diode bridge having input and output circuits into which current and voltage signals are introduced. A squaring network comprising parallel connected resistors and diodes permits the product of the voltage and current signals to be read out by a milliammeter in the input circuit.

7 Claims, 4 Drawing Figures

INVENTOR
CLARENCE W. HEWLETT, JR.
BY
George A. Herbster
ATTORNEY

RECTIFIER BRIDGE TYPE WATTMETER

BACKGROUND OF THE INVENTION

The present invention relates to electrical measuring instruments such as wattmeters used to measure electrical power by multiplying voltage and current signals from the source providing the power.

Prior art wattmeters of the static type utilize a current and voltage multiplication scheme known as the squaring method. The underlying theory of this method is based on the following equation:

$$(E+I)^2 - (E-I)^2 = 4EI$$

where $E$ is the voltage signal and $I$ is the current signal from the power source.

The quantities $E+I$ and $E-I$ are developed in the measuring circuit during alternate half cycles by the use of a rectifier bridge circuit and the squaring of the quantities is accomplished by the use of a non-linear impedance connected in series with the output circuit of the bridge. Such an arrangement is shown, for example, in U.S. Pat. No. 3,218,554 Corson, issued Nov. 16, 1965 and assigned to the same assignee as the present invention.

The rectifier bridge circuit of the Corson patent requires a potential transformer with a center-tapped secondary winding connected with diodes in two arms of the bridge. The other two arms of the bridge include two series connected load resistors across which the output meter is connected. This circuit consumes considerable power in the load resistors and the center tap of the potential transformer secondary winding must be accurately located to avoid measurement errors. Furthermore, variable impedances formed of non-linear resistance material such as silicon carbide are difficult to calibrate and control in production.

Accordingly, it is an object of the present invention to provide an improved wattmeter of the rectifier bridge type which has a lower power loss and which does not require the use of a potential transformer with a center-tapped secondary winding.

A further object of the invention is to provide a wattmeter of the rectifier bridge type which has improved operating stability and which can be constructed at a relatively low cost.

Further objects and advantages of the invention will become apparent as the following description proceeds.

SUMMARY

In accordance with the invention there is provided a wattmeter of the rectifier bridge type utilizing a four-arm diode bridge with input and output circuits connected to alternate junctions of the bridge arms. The voltage signal is introduced into the input circuit of the bridge and the current signal is introduced into the output circuit which also includes a non-linear impedance network to perform the squaring function. This arrangement permits the output meter to be connected in series with the input circuit and eliminates the need for load resistors in the bridge arms whereby power loss in the measurement circuit is reduced. The non-linear impedance network comprises a plurality of series-connected graduated resistors which are progressively shorted out by shunting diodes as the voltage applied to the network increases whereby the desired impedance characteristic is obtained in a stable and dependable manner to perform the squaring function in accordance with the above-mentioned equation.

For a better understanding of the invention, reference should be made to the following detailed description taken in connection with the accompanying drawings.

DESCRIPTION OF THE PREFERRED EMBODIMENTS

Figure 1:
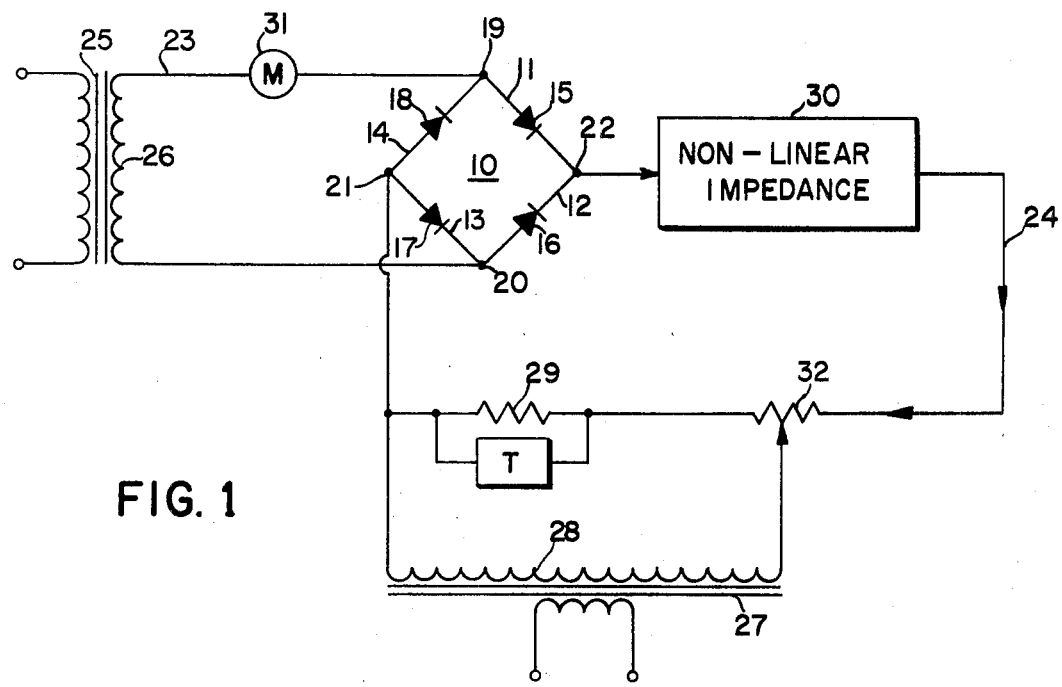
FIG. 1 shows a single phase wattmeter embodying the improved rectifier bridge circuit of the present invention.

Referring to FIG. 1 of the drawing, there is disclosed a single phase wattmeter having an improved rectifier bridge circuit constructed in accordance with the invention. The rectifier bridge circuit comprises a bridge circuit 10 having four serially connected arms 11, 12, 13 and 14, each arm including a diode, the diodes being numbered 15, 16, 17 and 18 respectively. The bridge has input connections 19 and 20 and output connections 21 and 22 at the alternate junctions of the bridge arms which are connected respectively to an input circuit 23 and an output circuit 24.

A potential transformer 25 energized by an alternating voltage signal from a source (not shown) providing the power being measured has a secondary winding 26 connected to the bridge input circuit 23. The diodes 15, 16, 17 and 18 are poled as shown, to provide full wave rectification of the input voltage so that the conventional direct current flow in the output circuit 24 is in the direction indicated by the arrows.

A current transformer 27 energized by an alternating current signal from the power source has a secondary winding 28 connected across a fixed resistor 29 and a potentiometer 32 in series with a bridge output circuit 24 as shown. In this manner an alternating voltage proportional to the alternating current signal provided by the power source is established in the bridge output circuit.

Bridge 10 rectifies the alternating voltage appearing across secondary winding 26 to establish a pulsating direct voltage between connections 22 and 21 of bridge 10. In the illustrated embodiment of the invention, connection 22 has a positive potential during every half cycle. Because the polarity of the voltage established across secondary winding 28 reverses in successive half cycles, the net voltage across output circuit 24 is equal to either the sum or the difference of the pulsating direct voltage and the alternating voltage across secondary winding 28. Thus, during one half cycle the net voltage in output circuit 24 is $E+I$ and during the next half cycle is $E-I$ where $E$ and $I$ represent the alternating voltage and current signals from the power source. By design the voltage $E$ is always greater than the voltage $I$ so that there is no reversal of current in the bridge output circuit, the current flow being in the direction of the arrows.

In order to multiply the quantities $E$ and $I$ in accordance with the squaring method, the quantities $E+I$ and $E-I$ must be squared and then subtracted. The squaring of these quantities is accomplished by the use of a non-linear impedance 30 connected in series with the output circuit. By design the impedance 30 has a characteristic such that the current through the impedance, which corresponds to the quantities $E+I$ and $E-I$, varies approximately as the square of the voltage applied across the impedance. A milliammeter 31 connected in series with the bridge input circuit 23 measures the difference between the two half cycle currents and thus provides a measure of the product of the current and voltage signals in accordance with the foregoing equation.

Temperature compensation of the circuit is obtained by the use of a thermistor T connected, as shown, in shunt with the resistor 29.

The rectifier bridge circuit described above has several advantages over the circuit disclosed in the above-mentioned Corson patent. It will be noted that the secondary winding 26 of the potential transformer 25 does not require a center tap. Thus, any measurement inaccuracies that might be caused by an improper location of a center tap are eliminated. While two additional diodes are required, they are inexpensive and easily matched. Also, it will be noted that the circuit permits the meter 31 to be connected in series with the bridge input circuit. This eliminates the need for two serially connected load resistors in the bridge circuit across which the meter is connected in the Corson circuit. This saves measurement power otherwise lost in the load resistors and thereby increases the efficiency of the metering circuit. This greater efficiency reflects itself in less heating of the diode network and in lower burden in the potential and current circuits. The greater efficiency also results in considerably lower voltage required from the potential transformer making it practical to use low voltage diodes in the squaring networks to be described in connection with FIGS. 2 and 4.

Figure 2:
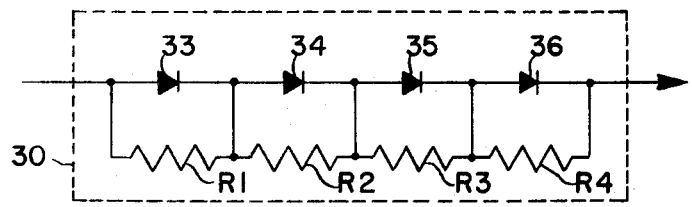
FIG. 2 shows the construction of the non-linear impedance network illustrated diagrammatically in FIG. 1.
Figure 4:
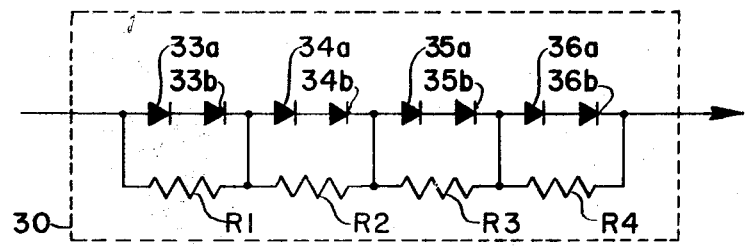
FIG. 4 shows a modified form of the non-linear impedance network.
Figure 3:
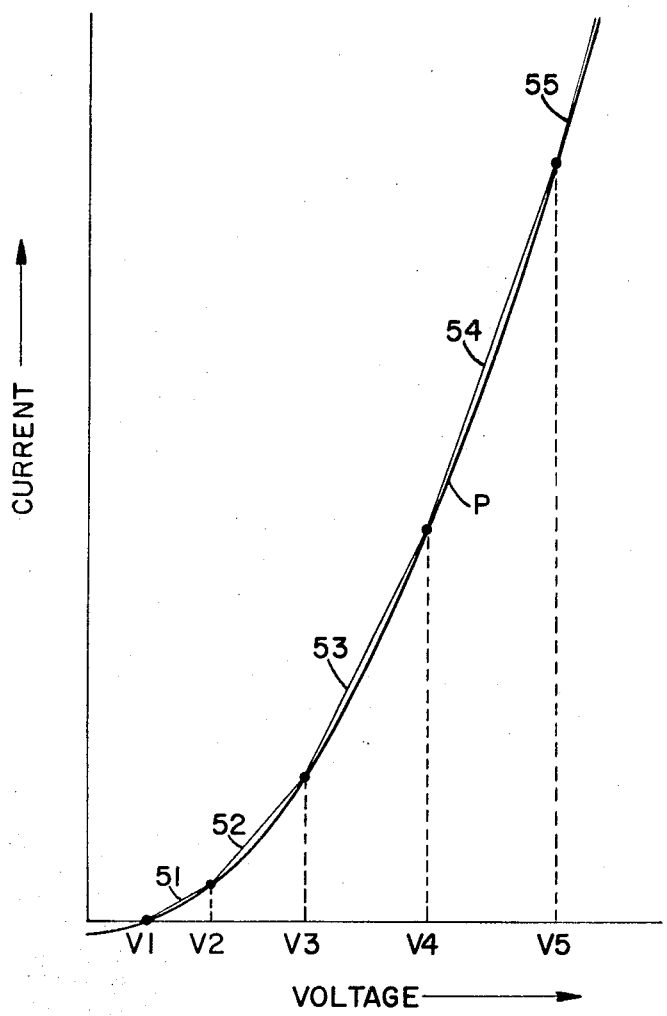
FIG. 3 is a graphical representation useful in explaining the theory of operation of the non-linear impedance network of FIG. 2.

FIGS. 2 and 4 show preferred constructions of the non-linear impedance 30 utilizing a resistor diode squaring network. Referring to FIG. 2 the network comprises series connected resistors R1, R2, R3 and R4 individually shunted by parallel circuits including diodes 33, 34, 35 and 36. The resistors have graduated values such that R1 > R2 > R3 > R4. By proper selection of the values of the resistors, the diodes become conducting in sequence as the voltage across the network increases to progressively short out the resistors whereby the desired current-impedance characteristic is obtained to perform the squaring function. An understanding of this action is facilitated by reference to the graphical representation shown in FIG. 3 which shows the impedance characteristic of the network. The curve P, which is a parabola, represents the desired voltage-current relationship to perform the squaring function in accordance with the equation:

$$I \alpha E^2$$

where $I$ is the current through the impedance 30 and $E$ is the voltage across the impedance. The degree to which the desired curve is approached depends on the number of resistors and diodes used and their impedance values. Assuming that the voltage V applied to the rectifier bridge network gradually increases from zero, there will be no appreciable current flow until the diodes in the bridge 10 begin to conduct at a voltage V1. At this point current passes through all four resistors R1, R2, R3 and R4 in series and the impedance curve follows the line 51. At voltage V2 the voltage drop across resistor R1 is sufficient to cause diode 33 to become fully conductive shorting out resistor R1. The impedance curve then follows the curve 52 until the voltage V3 is reached. At this point diode 34 becomes fully conductive and shorts out resistor R2. The impedance curve then follows the curve 53. Similarly, diodes 35 and 36 become fully conductive at voltages V4 and V5 to short out resistors R3 and R4 causing the impedance curve to follow the lines 54 and 55, etc. Thus it will be seen that the progressive shorting out of properly selected resistors R1, R2, R3 and R4 by the diodes 33, 34, 35 and 36 cause the impedance curve of the network to approximate closely the squaring function indicated by the parabola P.

Depending on the voltage-current characteristics of the type of diodes to be used in network 30 and the maximum deviation permissible between the parabolic curve P and any one of the linear curves 51 – 55, more than one diode may be used in each of the parallel circuits shunting the series connected resistors R1, R2, R3 and R4. This is illustrated in FIG. 4 which corresponds to FIG. 2 except that the parallel circuits shunting the resistors R1, R2, R3 and R4 include two diodes poled in the same direction in each parallel circuit. Thus the parallel circuit shunting the resistor R1 includes two diodes 33a and 33b. Similarly the resistors R2, R3 and R4 are shunted by parallel circuits including the pairs of diodes 34a and 34b, 35a and 35b, and 36a and 36b. In actual practice it is convenient to use the same type of diodes, such as type IN645, in both the bridge circuit 10 and the non-linear impedance network 30.

Where the same type of diode is used in pairs in each parallel circuit in network 30 as is used in bridge circuit 10, approximately equal voltage drops will exist across the combination of the two bridge diodes that are fully conductive at one time, and across each pair of diodes in network 30 that is fully conductive at the same time. Because the voltage drops determine the coordinance of the voltages V1, V2, V3, V4, V5 shown in FIG. 3, their equal spacing facilitates selection of resistance values which establish the linear curves 51 – 55.

As will be appreciated by those skilled in the art, the wattmeter circuits described above can be utilized for the measurement and indication of reactive power or VARS by merely providing a 90° phase shift in the input potential signals. Thus the appended claims are intended to cover such applications.

While there have been shown what are presently considered to be preferred embodiments of the invention, it will be apparent to those skilled in the art that various changes and modifications may be made therein without departing from the spirit and scope of the invention.

What is claimed as new and desired to be secured by Letters Patent of the United States is:

1. In an electrical measuring instrument of the wattmeter type for multiplying alternating voltage and current signals,
   a. a rectifier bridge comprising four serially connected arms, each arm including a diode, the diodes being interconnected in a full-wave bridge rectifier configuration, said bridge having input and output circuits connected to alternate junctions of the bridge arms,
   b. means for introducing a first voltage into the input circuit of the bridge, said first voltage being proportional to the alternating voltage signal,
   c. means for introducing a second voltage into the output circuit of the bridge, said second voltage being proportional to the alternating current signal,
   d. non-linear impedance means connected in series with the bridge output circuit having a characteristic such that the current through the impedance varies approximately as the square of the voltage applied across the impedance, and
   e. an ammeter connected in series with the bridge input circuit.

2. An electrical measuring instrument as recited in claim 1 wherein the means for introducing the second voltage into the output circuit of the bridge comprises resistance means connected in series with the bridge output circuit and a current transformer having a secondary winding connected across said resistance means.

3. An electrical measuring instrument as recited in claim 2 wherein the means for introducing the first voltage into the bridge input circuit is a potential transformer having a primary winding across which the alternating current signal is impressed and a secondary winding connected to the bridge input circuit.

4. An electrical measuring instrument as recited in claim 3 including a second resistance means connected in series with the bridge output circuit and a temperature-sensitive resistance connected in shunt relation with said second resistance means.

5. An electrical measuring instrument as recited in claim 1 wherein the non-linear impedance means comprises a plurality of series-connected resistors, each resistor being shunted by a parallel circuit including a diode.

6. An electrical measuring instrument as recited in claim 5 wherein the series-connected resistors have graduated resistance values selected to provide the required current-impedance characteristic of the non-linear impedance means.

7. An electrical measuring instrument as recited in claim 6 wherein each parallel circuit shunting each resistor includes a plurality of series-connected diodes poled to conduct current in the same direction.

* * * * *